US008446388B2

(12) United States Patent
Kim et al.

(10) Patent No.: US 8,446,388 B2
(45) Date of Patent: May 21, 2013

(54) RESISTIVE TOUCH SCREEN

(75) Inventors: Woon Chun Kim, Gyunggi-do (KR); Yong Soo Oh, Gyunggi-do (KR); Hyun Jun Kim, Gyunggi-do (KR); Jong Young Lee, Gyunggi-do (KR)

(73) Assignee: Samsung Electro-Mechanics Co., Ltd, Gyunggi-do (KR)

( * ) Notice: Subject to any disclaimer, the term of this patent is extended or adjusted under 35 U.S.C. 154(b) by 120 days.

(21) Appl. No.: 12/979,629

(22) Filed: Dec. 28, 2010

(65) Prior Publication Data

US 2012/0068959 A1    Mar. 22, 2012

(30) Foreign Application Priority Data

Sep. 20, 2010  (KR) .................. 10-2010-0092616

(51) Int. Cl.
*G06F 3/045*    (2006.01)

(52) U.S. Cl. .................. 345/174; 345/173; 178/18.03; 178/18.05

(58) Field of Classification Search .............. 345/173, 345/174; 178/18.05, 18.03; 349/58
See application file for complete search history.

(56) References Cited

U.S. PATENT DOCUMENTS

| | | | |
|---|---|---|---|
| 6,483,498 B1* | 11/2002 | Colgan et al. ........... | 345/173 |
| 6,556,189 B1* | 4/2003 | Takahata et al. ........ | 345/173 |
| 7,339,577 B2* | 3/2008 | Sato et al. .............. | 345/173 |
| 7,821,506 B2* | 10/2010 | Sato et al. .............. | 345/174 |
| 8,212,791 B2* | 7/2012 | Kusuda et al. .......... | 345/173 |
| 2002/0135569 A1* | 9/2002 | Chen ....................... | 345/173 |
| 2006/0102452 A1* | 5/2006 | Cok et al. ............... | 200/5 A |
| 2009/0167703 A1* | 7/2009 | You et al. ............... | 345/173 |
| 2010/0048254 A1* | 2/2010 | Jiang et al. ............. | 455/566 |
| 2010/0060563 A1* | 3/2010 | Hayton et al. ........... | 345/107 |
| 2010/0122900 A1* | 5/2010 | Krasnov .................. | 204/192.15 |
| 2010/0134439 A1* | 6/2010 | Ito et al. ................. | 345/174 |
| 2010/0243295 A1* | 9/2010 | Allemand et al. ....... | 174/250 |
| 2010/0245705 A1* | 9/2010 | Nakagawa et al. ...... | 349/58 |
| 2011/0102338 A1* | 5/2011 | Liu et al. ................. | 345/173 |
| 2011/0187666 A1* | 8/2011 | Min ........................ | 345/173 |
| 2011/0221699 A1* | 9/2011 | Kim ........................ | 345/174 |
| 2011/0267307 A1* | 11/2011 | Kim et al. ............... | 345/174 |
| 2012/0032917 A1* | 2/2012 | Yamaguchi .............. | 345/174 |
| 2012/0113054 A1* | 5/2012 | Hashimoto et al. ...... | 345/174 |

FOREIGN PATENT DOCUMENTS

| | | |
|---|---|---|
| JP | 2005-019056 | 1/2005 |
| KR | 1020080105244 | 12/2008 |
| KR | 1020090110770 | 10/2009 |

OTHER PUBLICATIONS

Office Action dated Nov. 30, 2011 for corresponding App. No. 10-2010-0092616.

* cited by examiner

*Primary Examiner* — Dmitriy Bolotin
(74) *Attorney, Agent, or Firm* — Ladas & Parry, LLP

(57) ABSTRACT

Disclosed herein is a resistive touch screen. The resistive touch screen includes a resistive touch panel configured to include a lower substrate formed with a lower electrode pattern in an active region through which images pass, an upper substrate formed with an upper electrode pattern to be opposite to the lower electrode pattern, and a spacer spacing the upper substrate from the lower substrate in order to contact the upper electrode pattern to the lower electrode pattern by external pressure; and a window bonded to the upper portion of the resistive touch panel by an optical clear adhesive, and including a covering film formed in the outer side region on the lower surface thereof and an elastic suppressing layer formed in the inner side region of the covering film.

11 Claims, 3 Drawing Sheets

RESISTIVE TOUCH SCREEN

CROSS REFERENCE TO RELATED APPLICATION

This application claims the benefit of Korean Patent Application No. 10-2010-0092616, filed on Sep. 20, 2010, entitled "Resistive Touch Screen," which is hereby incorporated by reference in its entirety into this application.

BACKGROUND OF THE INVENTION

1. Technical Field

The present invention relates to a resistive touch screen.

2. Description of the Related Art

With the development of the mobile communication technology, user terminals such cellular phones, PDAs, navigations can serve as a display unit that simply displays character information as well serve as a unit for providing various and complex multi-media such as audio, moving picture, radio internet web browser, etc. Recently, a demand for implementing a larger display screen within a terminal of a limited size has been increasingly expanded, such that a display scheme using a touch screen has been greatly in the limelight. The touch screen has an advantage of saving a space by integrating a screen and a coordinate input unit, as compared to a key input scheme according to a prior art.

A type of current mainly used touch screen is largely classified into two schemes.

First, in the capacitive touch screen, an upper substrate on which a first electrode pattern is formed having first directionality and a lower substrate on which a second electrode pattern having second directionality is formed are spaced apart from each other and an insulator is inserted between the first electrode pattern and the second electrode pattern to prevent them from contacting each other.

The capacitive touch screen measures a change in capacitance generated in the first electrode pattern and the second electrode pattern when input units touch the touch screen, thereby calculating coordinates of touched points.

The resistive touch screen is a type where an upper substrate on which an upper resistive film is formed and a lower resistive film is formed may be spaced apart from each other by a spacer and may be disposed to contact each other by an external pressure. The resistive touch screen depends on a scheme where when the upper substrate on which the upper resistive film is formed is pressed by input units, for example, fingers, pen, and so on, the upper/lower resistive films are conducted to each other and a controller recognizes the change in voltage according to the change in resistance value at the pressed point in order to recognize the touched coordinates.

The resistive touch screen generally includes a window formed on the upper substrate. Since the touch screen is coupled with a display device, a predetermined strength of window should be used to protect the touch screen.

Further, the resistive touch screen includes a covering film formed on the lower surface of the window in order to prevent electrode wirings made of an opaque material from being recognized from the outside. Meanwhile, the window formed with the covering film is bonded to the resistive touch screen by using an optical clear adhesive (OCA).

In this case, the optical clear adhesive (OCA), which is a transparent resin adhesive, has elastic force buffering external impact. Therefore, when the optical clear adhesive has a predetermined thickness or more, several problems occur. Generally, the upper resistive film and the lower resistive film contact each other due to the warpage of the upper substrate by the external pressure, such that they are conducted to each other. However, excessive pressure loads are required so as to generate touch signals that represent the generation of the external pressure when the optical clear adhesive has a predetermined thickness or more, such that touch sensitivity is degraded (that is, even though a user applies external pressure, touch signals are not generated due to low pressure loads). Therefore, this causes the trouble that the user should touch the window several times or more.

When the covering film is formed on the lower surface of the window, the thickness of the optical clear adhesive is further increased due to the thickness of the covering film, such that the foregoing problems are more serious. Therefore, research for improving the foregoing problems has been conducted.

SUMMARY OF THE INVENTION

The present invention has been made in an effort to provide a resistive touch screen including an elastic suppressing layer buffering elastic force in order to suppress elastic force generated due to an excessive thickness of an optical clear adhesive when a covering film is formed on a lower surface of a window.

According to a preferred embodiment of the present invention, there is provided a resistive touch screen, including: a resistive touch panel configured to include a lower substrate formed with a lower electrode pattern in an active region through which images pass, an upper substrate formed with an upper electrode pattern to be opposite to the lower electrode pattern, and a spacer spacing the upper substrate from the lower substrate in order to contact the upper electrode pattern to the lower electrode pattern by external pressure; and a window bonded to the upper portion the resistive touch panel by an optical adhesive, and including a covering film formed in the outer side region on the lower surface thereof and an elastic suppressing layer formed in the inner side region of the covering film.

The upper electrode pattern and the lower electrode pattern may be made of a conductive polymer.

The conductive polymer may be any one of polythiophenes, polypyrroles, polyanilines, polyacetylenes, and polyphenylenes.

The elastic suppressing layer may be made of acrylic resin.

The thickness of the elastic suppressing layer may correspond to the thickness of the covering film.

DESCRIPTION OF THE PREFERRED EMBODIMENTS

Figure 1:
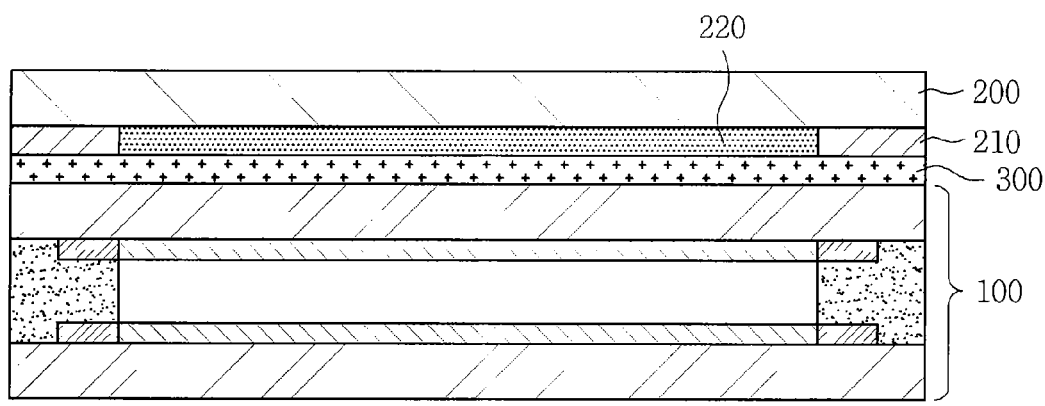
FIG. 1 is a cross-sectional view showing a resistive touch screen according to a preferred embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings.

Further, terms used in the specification, 'first', 'second', etc. can be used to describe various components, but the components are not to be construed as being limited to the terms. The terms are only used to differentiate one component from other components. Further, when it is determined that the detailed description of the known art related to the present invention may obscure the gist of the present invention, the detailed description thereof will be omitted.

Hereinafter, preferred embodiments of a linear vibrator according to the present invention will be described in detail with reference to the accompanying drawings.

Figure 2:
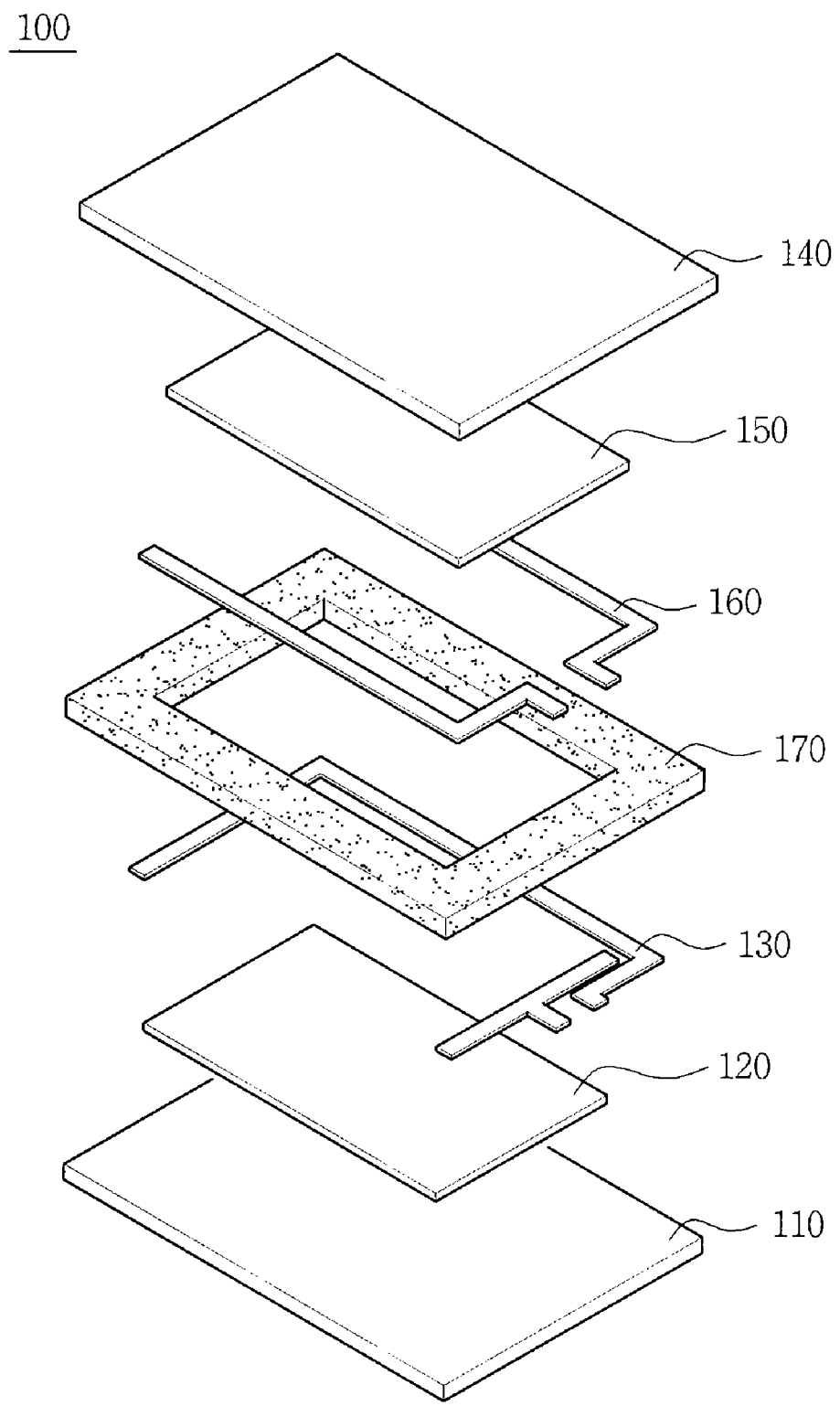
FIG. 2 is an exploded perspective view for explaining a configuration of the resistive touch panel adopted in FIG. 1.
Figure 3:
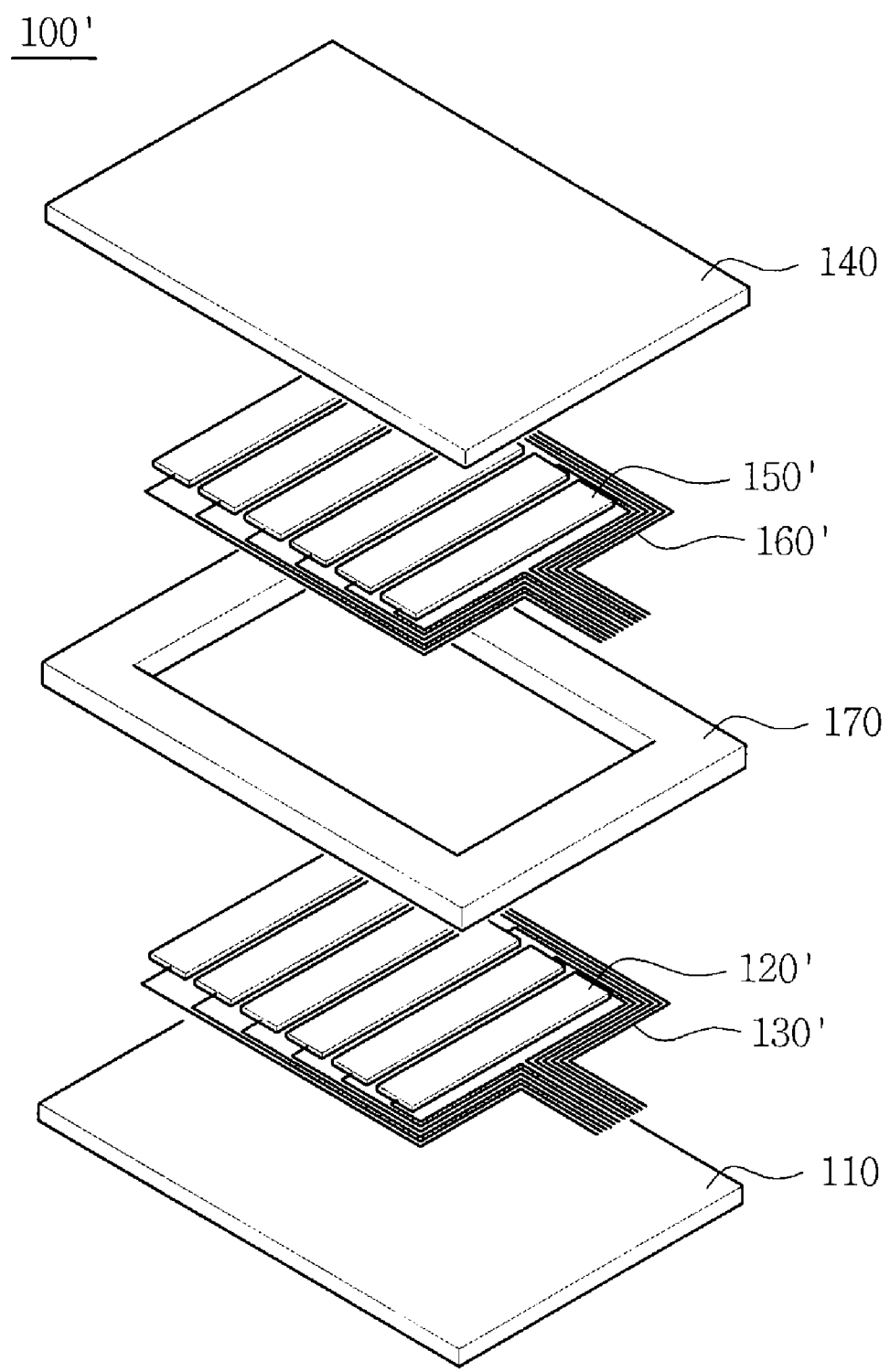
FIG. 3 is an exploded perspective view for explaining another configuration of the resistive touch panel adopted in FIG. 1.

FIG. 1 is a cross-sectional view showing a resistive touch screen according to a preferred embodiment of the present invention, FIG. 2 is an exploded perspective view for explaining a configuration of the resistive touch panel adopted in FIG. 1, and FIG. 3 is an exploded perspective view for explaining another configuration of a resistive touch panel adopted in FIG. 1. Hereinafter, a resistive touch screen (hereinafter, referred to as a touch screen) according to the preferred embodiments will be described with reference to these figures.

As shown in FIG. 1, a touch screen according to a preferred embodiment of the present invention includes a resistive touch panel 100 and a window 200 bonded to the upper portion of the resistive touch panel by an optical clear adhesive 300, wherein the outer side region on the lower surface of the window is provided with a covering film 210 and the inner side region of the covering film is provided with an elastic suppressing layer 220.

First, the resistive touch panel 100 that can be adopted in the present invention will be described with reference to FIGS. 2 and 3.

FIG. 2 shows a general analog resistive touch panel. The analog resistive touch panel 100 is configured to include a lower substrate formed with a lower electrode pattern in an active region through which images pass, an upper substrate formed with an upper electrode pattern to be opposite to the lower electrode pattern, and a spacer spacing the upper substrate from the lower substrate in order to contact the upper electrode pattern to the lower electrode pattern by external pressure.

The lower substrate 110 and the upper substrate 140 may use a film substrate as a transparent member. Among them, the film substrate, the film substrate may be made of polyethylene terephthalate (PET), polymethylmethacrylate (PMMA), polypropylene (PP), polyethylene (PE), polyethylenenaphatalate (PEN), polycarbonate (PC), polyethersulfone (PES), polyimide (PI), polyvinylalcohol (PVA), cyclic olefin copolymer (COC), stylene polymer, etc., but are not specifically limited.

The upper substrate 140 generally adopts the polyethylene terephthalate (PET) and the lower substrate 110 may adopt a glass substrate if necessary.

The upper surface of the lower substrate 110 and the lower surface of the upper substrate 140 are each formed with a lower electrode pattern 120 and an upper electrode pattern 150 to be opposite to each other.

The electrode patterns 120 and 150 are formed in the active region through which images generated from a display device pass. Meanwhile, in the case of the analog resistive touch panel 100, the electrode pattern has a film shape.

The electrode patterns 120 and 150 may made of a transparent conductive material such as a metal oxide (representatively ITO). Further, the electrode patterns 120 and 150 may adopt a conductive polymer, which has good flexibility and is inexpensive in terms of producing costs. The conductive polymer may adopt an organic compound, such as polythiophenes, polypyrroles, polyanilines, polyacetylenes, polyphenylenes, or the like. In particular, among the polythiophenes, poly-3,4-ethylenedioxythiophene/polystyrenesulfonate (PEDOT/PSS) compound is most preferable and at least one of the organic compounds may be mixed. In addition, when carbon nanotube or the like is further mixed, conductivity may be more enhanced.

Electrode wirings 130 and 160 connected to the electrode patterns 120 and 150 are formed in an inactive region of the lower substrate 110 and the upper substrate 140. The electrode wirings 130 and 160 are made of metal (in particular, silver paste) having low resistance and the lower electrode wiring 130 and the upper electrode pattern 160 have directionality orthogonal to each other. As shown in FIG. 2, in the case of a 4-line touch panel, the lower electrode wiring 130 is conducted to the film-shaped electrode pattern 120 in an X direction and the upper electrode wiring 160 is conducted to the film-shaped electrode pattern 150 in a Y direction, such that it transfers a change in voltage according to external touch to a controller.

Further, the spacer 170 has a shape in which an opening part is formed so that the upper electrode pattern 150 can be in contact with the lower electrode pattern 120 due to the warpage of the upper substrate 140 by external pressure. The spacer 170 may be composed of a double-sided adhesive sheet. Although not shown in FIG. 3, in order to prevent the malfunction of the touch panel, a dot spacer made of insulating synthetic resin such as epoxy acrylic resin may be further provided.

FIG. 3 shows a digital resistive touch panel. A digital resistive touch panel 100' includes a plurality of patterned electrode patterns 120' and 150', unlike the analog resistive touch panel 100 including the film-shaped electrode patterns 120 and 150. As a result, the number of electrode wirings 130' and 160' is also increased.

The digital resistive touch panel 100' measures the change in voltage changed in each of the electrode patterns, thereby making it possible to obtain coordinate information when multi-point is touched, including a plurality of electrode patterns. A method of obtaining the coordinate information of the digital resistive touch panel 100' is known and therefore, the detailed description thereof will be omitted.

Meanwhile, the electrode patterns shown in FIG. 3 has a bar shape, but this is by way of example only. As a result, the electrode patterns may be practiced by being modified into another shape.

Referring back to FIG. 1, the window 200 formed on the upper portion of the touch panel 100 will be described.

The window 200 provides a surface protecting the touch panel 100 and contacting an input unit. The window 200 may adopt a film substrate (in particular, polymethylemethacrylate (PMMA), polycarbonate (PC)) or a glass substrate (in particular, tempered glass), all of which have excellent durability and good transparency.

The outer side region on the lower surface of the window 200 is provided with the covering film 210. When the electrode wirings 130 and 150 are made of metal such as silver paste, the electrode wirings 130 and 150 may be recognized from the outside. In order to prevent it, the covering film 210 is provided. The covering film 210 may be formed by printing ink having low brightness such as black ink to the outer side region on the lower surface of the window 200.

The window 200 having the covering film 210 formed in the outer side region on the lower surface thereof is bonded to the upper substrate 140 of the touch panel by the optical clear adhesive. In this configuration, the outer side region of the window 200 is an inactive region through which images generated from the display device do not pass.

In this case, in order to prevent the excessive elastic force from being generated due to the use of the optical clear adhesive 300, an elastic suppressing layer 220 is formed in the inner side region of the covering film 210.

Generally, the optical clear adhesive 300 may have the thickness of 25 μm to 35 μl. When the optical clear adhesive has a thickness thinner than the above-mentioned thickness, adhesion is degraded and when the optical clear adhesive has a thickness thicker than the above-mentioned thickness, excessive elastic force is generated to absorb a large amount of pressure load. Meanwhile, although the covering film 210 is formed by a printing scheme using the black ink, it has a thickness of 8 μm to 12 μm.

When only the optical clear adhesive 300 is used according to the scheme of bonding the existing touch panel 100 to the window 200, the optical clear adhesive 300 has a shape where the outer side of the optical clear adhesive 300 is stepped by the covering film 210 formed on the lower surface of the window 200.

Therefore, the outer side region formed with the covering film 210 has a thickness in the range of 33 μm to 47 μm from the window 200 to the upper surface of the upper substrate 140 (including the covering film 210 having the thickness of 8 μm to 12 μm and the optical clear adhesive 300 having the thickness of 25 μm to 35 μm) and the inner side region having the thickness in the range of 33 μl to 47 μm is entirely filled with the optical clear adhesive 300.

Therefore, the thickness of the optical clear adhesive 300 formed in the inner side region in which the lower electrode pattern 120 and the upper electrode pattern 150 contact each other exceeds the range of 25 μm to 35 μm and absorbs a large amount of external pressure. Therefore, the stronger pressure loads are required in order to generate touch signals. For example, when the pressure load of 6 is required in the range of 25 μm to 35 μm, the pressure load of 8 is required in the range of 33 μm to 47 μm. This implies that the external pressure is absorbed by the optical clear adhesive having the increased input load of 2.

In order to solve the foregoing problems, the present invention forms the elastic suppressing layer 220 in the inner side region of the covering film 210 to reduce the thickness of the optical clear adhesive 300 formed in the inner side region. The elastic suppressing layer 220 transfers the pressure load to the upper substrate 140 without absorbing the pressure load, thereby making it possible to generate the touch signals even in the low pressure load.

The elastic suppressing layer 220 is made of a transparent material, having elastic force lower than that of the optical adhesive 300 and is formed on the lower surface of the window 200 by a screen printing scheme.

The elastic suppressing layer 220 may be made of several materials satisfying the conditions but may be made of acrylic resin. The acrylic resin has excellent light transparency, is easily handled, and easily controls the thickness of the elastic suppressing layer 220.

The effects obtained by forming the elastic suppressing layer 220 are more apparent in the case where the electrode patterns 120 and 150 are made of the conductive polymer. The conductive polymer has characteristics of generating the touch signals when the pressure load stronger than that of metal oxide such as ITO is applied.

For example, when the electrode pattern is made of ITO, the pressure load of 6 is required in the range of 25 μm to 35 μm, while when the electrode pattern is made of the conductive polymer, the pressure load of 8 is required. Therefore, when the optical clear adhesive 300 has the range of 33 μm to 47 μm without forming the elastic suppressing layer 220, the pressure load of approximately 10 is required, such that the absolute value of the pressure load for generating the touch signals is further increased.

In the case of the conductive polymer having the increased pressure load independently of the thickness of the optical clear adhesive 300, the elastic suppressing layer 220 is essential in order to minimize the pressure load.

In this case, in order to form the more preferred touch screen, the thickness of the elastic suppressing layer 220 may correspond to the thickness of the covering film 210. Therefore, the elastic suppressing layer 220 and the covering film 210 provide the flat surface, such that the optical clear adhesive 300 may be formed to have the uniform thickness.

The resistive touch screen according to the present invention forms the elastic suppressing layer in the inside region of the covering film formed on the lower surface of the window to reduce the thickness of the optical adhesive, such that the external pressure transfer rate from the window to the upper substrate is increased, thereby making it possible to reduce the pressure loads and improve the touch sensitivity.

Generally, the resistive touch screen including the electrode patterns made of the conductive polymer requires the pressure loads stronger than that of the existing resistive touch screen adopting the electrode patterns made of the conductive material. However, the resistive touch screen according to the present invention adopts the elastic suppressing layer, thereby making it possible to reduce the pressure loads.

Although the preferred embodiments of the present invention have been disclosed for illustrative purposes, they are for specifically explaining the present invention and thus a touch screen and a method of manufacturing the same according to the present invention are not limited thereto, but those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:
1. A resistive touch screen, comprising: a resistive touch panel including a lower substrate formed with a lower electrode pattern in an active region through which images pass, an upper substrate formed with an upper electrode pattern to be opposite to the lower electrode pattern, and a spacer spacing the upper substrate from the lower substrate in order to contact the upper electrode pattern to the lower electrode pattern by external pressure; and a window bonded to the upper portion of the resistive touch panel by an optical clear adhesive, and including a covering film formed in the outer side region on the lower surface thereof and an elastic suppressing layer formed in the inner side region of the covering film, wherein the elastic suppressing layer and the covering film are arranged to form a flat surface so that the optical clear adhesive has an uniform thickness.

2. The resistive touch screen as set forth in claim 1, wherein the upper electrode pattern and the lower electrode pattern are made of a conductive polymer.

3. The resistive touch screen as set forth in claim 2, wherein the conductive polymer is any one of polythiophenes, polypyrroles, polyanilines, polyacetylenes, and polyphenylenes.

4. The resistive touch screen as set forth in claim 1, wherein the elastic suppressing layer is made of acrylic resin.

5. The resistive touch screen as set forth in claim 1, wherein the thickness of the elastic suppressing layer corresponds to the thickness of the covering film.

6. The resistive touch screen as set forth in claim 1, wherein an elastic force of the elastic suppressing layer is lower than an elastic force of the optical clear adhesive.

7. A resistive touch screen, comprising:

a resistive touch panel including a lower substrate formed with a lower electrode pattern in an active region through which images pass, an upper substrate formed with an upper electrode pattern to be opposite to the lower electrode pattern, and a spacer spacing the upper substrate from the lower substrate in order to contact the upper electrode pattern to the lower electrode pattern by external pressure; and a window bonded to the upper portion of the resistive touch panel by an optical clear adhesive, and including a covering film formed in an outer side region on the lower surface thereof and an elastic suppressing layer formed in an inner side region of the covering film, wherein the elastic suppressing layer and the covering film are arranged to form a flat surface so that the optical clear adhesive has an uniform thickness, and wherein an elastic force of the elastic suppressing layer is lower than an elastic force of the optical clear adhesive.

8. The resistive touch screen as set forth in claim 7, wherein the upper electrode pattern and the lower electrode pattern are made of a conductive polymer.

9. The resistive touch screen as set forth in claim 8, wherein the conductive polymer is any one of polythiophenes, polypyrroles, polyanilines, polyacetylenes, and polyphenylenes.

10. The resistive touch screen as set forth in claim 7, wherein the elastic suppressing layer is made of acrylic resin.

11. The resistive touch screen as set forth in claim 7, wherein the thickness of the elastic suppressing layer corresponds to the thickness of the covering film.

\* \* \* \* \*